May 17, 1960     E. WALTER     2,936,670

METHOD OF MANUFACTURING MULTI-CORE CABLES

Filed Dec. 14, 1954     2 Sheets-Sheet 1

ERWIN WALTER
INVENTOR

By Richards, David and Norton
his ATTYs

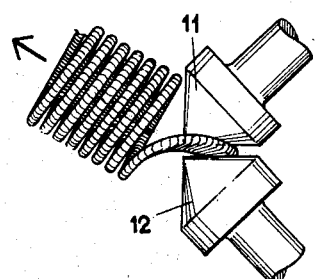
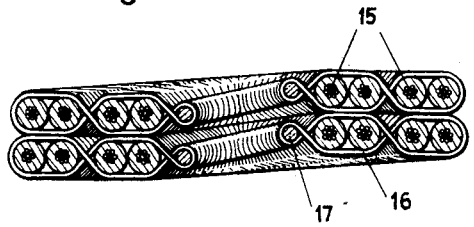
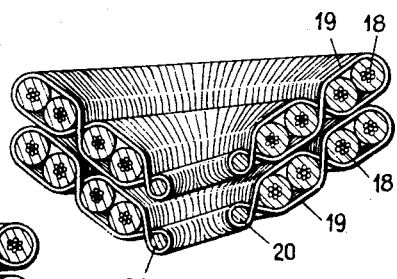
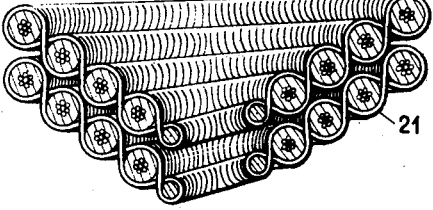
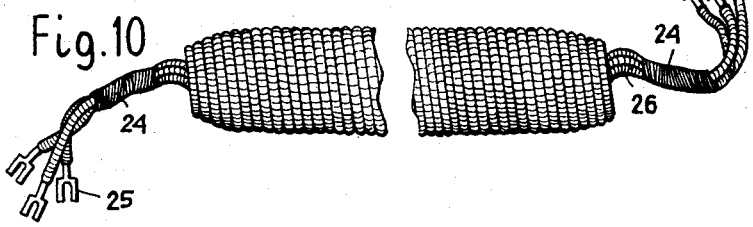

United States Patent Office 2,936,670
Patented May 17, 1960

2,936,670
METHOD OF MANUFACTURING MULTI-CORE CABLES

Erwin Walter, Florence, Italy

Application December 14, 1954, Serial No. 475,241

Claims priority, application Italy January 11, 1954

4 Claims. (Cl. 87—8)

This invention relates to multi-core cables or cords and to a method of manufacturing the same. The invention especially concerns the formation of loose cables, employed for example for telephonic apparatus and other uses, such cables or cords generally being provided with an external tubular covering formed by interbraided strands passing in opposite spirals around the conductors. Cables or cords of this type are manufactured—according to known form—with completely or nearly circular or triangular cross-sections and are provided with a suitable elastic element, by means of which a cable may reassume a helical formation after temporary elongations of the cable. Owing to the circular cross-section of the cable, the turns of the cable have relatively large transverse dimensions and thus a spiral cable has a relatively small number of turns per unit length.

One object of the invention is to provide a method of forming a cable or cord which has a flattened braid-like cross-section wherein the electrical conductors form the warp in the braid, that is, it is substantially braided band-like and is acted upon in such a way as to assume a helical formation with the flat cross-section so positioned that the major surfaces of the band along each turn face towards the corresponding surfaces of the adjacent turns. The cable therefore includes a greater number of turns per unit length than that of a cable having a circular cross-section.

The cable as per the invention can be manufactured using very small band-braiding machines with a small number of carriers. The cable includes several conductors or wires and at least one elastic element for retaining its helical formation and keeping the single turns compact, said conductors and said element being connected by braided threads and forming the warp in the braid.

The elastic element may be of rubber arranged along the inner edge of the turns, or it may be formed by a metallic spring, and in this instance it may be located at any position along the cross-section of the band.

The cable preferably has its various conductors arranged and aligned in the direction of the major axis of the cross-section. Each conductor has a length greater than the adjacent conductor situated on its inner side in the helical formation; this arrangement tends to ensure that the individual conductors may have such lengths as to form coaxial spirals each having the same pitch but with a different radius.

The cable with a flattened braided band-like cross-section may have the major axis of the cross-section extending substantially in the radial direction. The major axis of the cross-section may alternatively be inclined with respect to the radius of the spiral; the latter arrangement of the cable allows a better centering of the various turns than in the former arrangement, when the turns are brought together again after an extension of the cable; in this latter arrangement, the external diameter of the spiral decreases and consequently it is more resistant against twisting.

A second object of the invention is to provide an apparatus and method for the manufacture of cables of helical braided band formation possessing the abovementioned features. An apparatus according to the invention, comprises a conventional braiding machine of the band type, wherein means are provided for effecting the withdrawal of the single conductors at different relative speeds, the speeds increasing with respect to one another according to the distance the element is located from the inner edge, which latter may be an elastic element; said element is preferably an elastically extensible element which is arranged to be in tension.

In order to obtain this withdrawal at different speeds, an arrangement for said withdrawal is actuated as part of the bandbraider by a pair of rotating members, formed by independent rotating elements, or by solids of revolution or even merely by conical surface members, said members being a part of the braiding machine and rotating with a tangential speed in the same direction at the area of their periphery which lies closest together at any given time. The conductors, guided by appropriate means, are passed through the rotating members and contemporaneously bound by braided yarn as warp in the band-like braid.

The accompanying drawing illustrates several embodiments of a cable, and diagrammatic illustrations of means for the production thereof. In the drawing.

Figure 4:
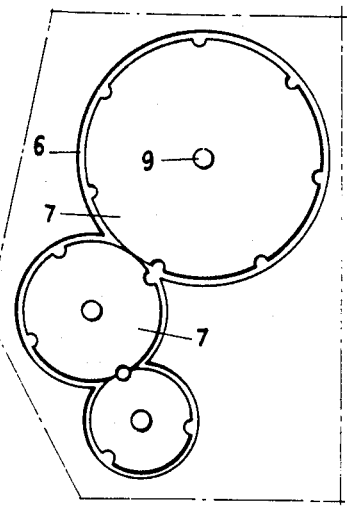
Figure 5:
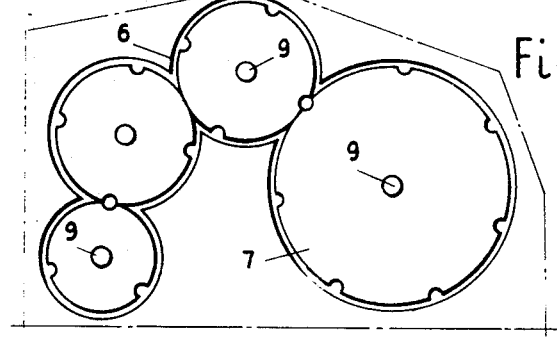

Figs. 4 and 5 diagrammatically illustrate two additional forms of the motion track of spools employed for the formation of the cable braiding;

Fig. 6 illustrates a plan view of a detail of the pair of withdrawal members;

Figs. 7, 8 and 9 are cross-sectional views of a few turns of a helical cable, according to three embodiments;

Fig. 10 illustrate a cable complete with terminals, primarily for the telephonic receiving apparatus.

Figure 1:
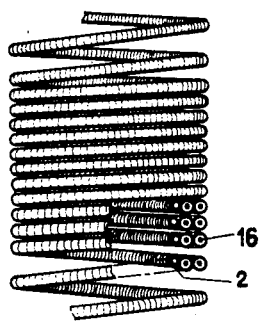
Fig. 1 is a side elevation, partly in section, of a portion of the helical cable.
Figure 2:
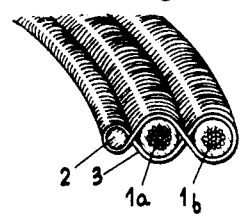
Fig. 2 is a perspective view of said cable, partly in section.
Figure 3:
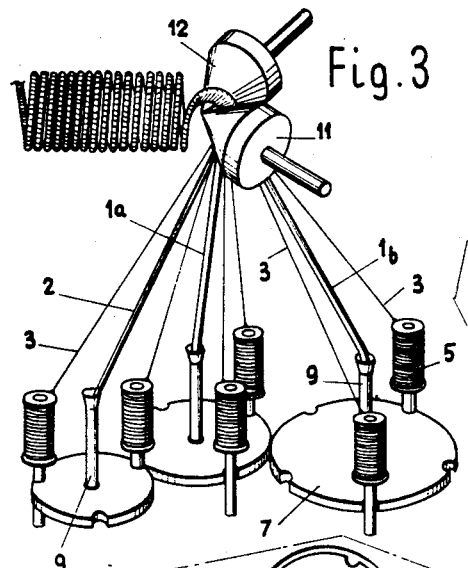
Fig. 3 is a perspective view of an apparatus as part of the bandbraider for the production of the cable.

Referring now to Figs. 1 to 3, these show a cable or cord formed by a definitive number—two in the embodiment—of aligned conductors 1a, 1b suitably covered with an insulating material of the continuous cross-section or stranded type. An elastic element which may be a round rubber member 2, or the like, is located adjacent the conductor 1a. The conductors and the elastic member are located adjacent each other, so that their cross-sections are aligned. The number of the conductors 1 may be varied and also their arrangement may be varied, provided that it is always possible to obtain a flattened braid-like cross-section, that is a braided band for the complete cable.

The assembly of the conductors 1 and of the elastic element 2, which is arranged to be in tension, are connected by elements 3 formed by braided threads, which encircle the individual conductors on both sides and connect them so as to form a band-like cable wherein the conductors form the warp.

The braided band-like cable must be formed spirally as illustrated in Fig. 1, with a flat cross-section which extends in the radial direction of the spiral; in other words, the braided band-like cable describes part of a helical surface set up by a generating line rotated substantially perpendicular to the axis of the cable. The various conductors, such as those denoted by 1a, 1b must have a length which increases progressively according to the distance of the conductor from the elastic element, so that the aforesaid arrangement may regularly occur, besides having the tensioned elastic element 2, which is arranged in the inside of the helical winding; through this arrangement it is possible to ensure that each conductor 1 has a length corresponding to the spiral described by the cable in the arrangement illustrated in Fig. 1.

Suitable modifications may be made in conventional machines designed for the formation of braided thread band, such as the one denoted by 3, so as to obtain this arrangement of the cable. Machines of this kind usually include spools 5 (see Fig. 3) for said threads, and said spools follow crossed undulated paths along guide grooves 6 and conveying wheels 7.

Passages through which pass the element 1a, 1b, 2 to be coated, are provided in the axles 9 of the wheels 7.

The elastic element 2, which is in tension, emerges out of the passage in the axle of the smallest wheel 7 (see Fig. 3) and the conductors, such as 1a, 1b, emerge out of the passages in the other axles 9 giving the warp of braid, while the binding threads 3 are unwound from the spools 5.

The elements 2, 1a, 1b pass through two rotating cones 11, 12 arranged in such a way as to have two substantially parallel generating lines. The wire elements 1b, 1a, 2 pass between the cones and the braiding is contemporaneously formed by means of the threads 3. This is effected in order to obtain the withdrawal of the single elements 2, 1a, 1b at different speeds, with respect to one another, and in order to have different lengths of said elements in the formed cord or band. A suitable member, not shown in the drawing, may serve to locate the assembly of the conductors in the right position with respect to the cones.

The two cones rotate around their axes in such a way as to have the same peripheral speeds at the contacting area. As the peripheral speed of the cones varies along the generating line it is obvious that the length of the individual conductors which are withdrawn by the pair of cones in a predetermined time is also varied. Therefore, following the embodiment of the drawing and arranging the conductor 1b in a position remote from the apices of the cones and the conductor 1a nearer said apices, the speed with which the conductor 1b is withdrawn is higher than that at which the conductor 1a is withdrawn.

According to the embodiment of Fig. 7, the conductors 15 are four in number and are wound two by two in the compartments defined by the braided threads 16; also in this case, the turns have a cross-section having the direction of the major axis substantially perpendicular to the geometrical axis of the helix. The elastic element forming the inner helix is denoted by 17.

In the embodiment illustrated in Fig. 8, the cables 18 are bound, as in the previous case, by braided threads 19 which winds them two by two, while the elastic element 20 is wound alone; in this case the major axis of the flattened cross-section of the cable is inclined with respect to the geometrical axis.

Fig. 9 illustrates the cross-section of a four-core cable similar to the one in Fig. 8, but in which the threads 21 wind separately around the individual conductors and the elastic element.

By modifying the difference between the withdrawal speed of the various conductors, and—in the case of the conical members—by modifying the angle between said members, it is possible to obtain a variation of the inclination of the major axis of the band with respect to the axis of the spiral. To decrease the angle of inclination between the axis of the spiral and said major axis of the cross-section, the angle between the conical member is decreased.

In order to obtain turns provided with a smaller camber, the assembly of the conductors is moved towards the zone where the tangential speed is smaller, that is towards the apices of the conical members, so as to obtain a higher percentage difference of withdrawal speed.

The withdrawal cones 11 and 12 may be complete cones or may be restricted to a truncated conical surface. The conical surfaces must be designed to have an appropriate friction coefficient.

The elastic element, whatever its form, must have such dimensions in cross-section that it does not adhere to the surfaces of the cones 11, 12, because when bound by the covering to the other wire elements, formed by the conductors 1, it is drawn by them independently of the drawing action of the cones.

The elastic element may also be made up from a metallic wire helical spring or any other suitable material, instead of being formed by rubber. The axial tension of the elastic element, when it is made of rubber, should be as to maintain the regular helical arrangement of the cable and to cause the return of the cable to the compact turns position, after the cable has been elongated during the use for which it is designed.

Rotary members formed by solids of revolution rotating about inclined axes and functionally equivalent to the aforesaid cones may be used instead of the withdrawal cones 11, 12. One or both rotating members for the withdrawal of the conductors may also be formed by separate elements, such as grooved rollers or the like. It is not to be excluded that only one of said rotary members may drive and the other be driven.

In order to obtain a correct return of the compact wound cable, it is desirable for the braided threads to be at least partly formed by a relatively rigid and smooth yarn; yarns of this kind are for example polyamide resins or long chain synthetic polyamides (nylon), artificial silk having a thick thread and the like. This arrangement makes the assembly of the braided threads stiffer and aids the relative sliding of the adjacent turns; in addition, the presence of the stiff yarn prevents—in the case of an elastic element formed by rubber—the covering from squeezing the rubber and preventing freedom of movement.

The spacing of the cover threads will determine whether the rubber coating of the conductors is wholly or only partly hidden from view, i.e., whether the compartments formed by the cover threads are provided with spaces through which the interior may be viewed or whether the compartment wall is solid and continuous so that the interior is not visible. To provide the compartment wall or covering with spaces, i.e., to provide a partial covering, the withdrawal speed of the conductors and thus the speed of rotation of the conical members or their equivalents, is kept relatively high with respect to the speed of revolution of the spools of the braided yarn.

Fig. 10 is an outer view of a cable designed to be used for telephonic receivers or other equivalent uses. In this figure 24 denotes a sleeve which binds the cable in a corresponding position at each end of the coverings. The conductors are free on one side of said sleeves 24 and carry the terminals 25 designed for making connection to the telephonic apparatus terminals.

What I claim is:

1. The method of manufacturing multi-core cable which comprises drawing off a plurality of elements all at different speeds, continuously forming said elements into coaxial spirals of the same pitch and different diameters, and continuously braiding a plurality of cover threads over said elements to form a plurality of compartments, at least one of said elements being disposed in each of said compartments, whereby said elements are joined together and are formed into multi-core cable of spiral formation having an elongated section.

2. The method of manufacturing a multi-core cable which comprises drawing off a spiral-formed elastic element, simultaneously drawing off a plurality of conductors at different speeds increasing with the spacing from the elastic element, and continuously braiding a plurality of cover threads over said elements to form a plurality of compartments, said elastic element being positioned in one of said compartments separate from said conductors to thereby form a multicore cable, said cable resiliently returning to a form in which said element and said conductors are arranged in spirals of increasing diameter corresponding to the speed of withdrawal, the cross-section of said cable being elongated with said conductors and said element aligned and consecutively spaced from a common axis in dependence upon the diameters of the spirals.

3. The method defined in claim 2, wherein said cover threads are braided to form at least three compartments, conductors being provided in all compartments not containing an elastic element.

4. The method of claim 2, wherein said elastic element is drawn off at a lower speed than any of said conductors, whereby the spiral of said elastic element has the smallest diameter so that said element is innermost in said cable.

References Cited in the file of this patent

UNITED STATES PATENTS

| | | |
|---|---|---|
| 857,367 | Shore et al. | June 18, 1907 |
| 1,707,718 | Frederickson | Apr. 2, 1929 |
| 2,060,913 | Weaver | Nov. 17, 1936 |
| 2,086,978 | Hollenweger | July 13, 1937 |
| 2,133,004 | Williams et al. | Oct. 11, 1938 |
| 2,177,742 | Peterson | Oct. 31, 1939 |
| 2,232,524 | Hackbarth | Feb. 18, 1941 |
| 2,262,227 | Fulson | Nov. 11, 1941 |
| 2,281,542 | Barrans et al. | May 5, 1942 |
| 2,468,773 | Musinski | May 3, 1949 |

FOREIGN PATENTS

| | | |
|---|---|---|
| 676,980 | Great Britain | Aug. 6, 1952 |